United States Patent [19]

Ingram

[11] 3,861,075
[45] Jan. 21, 1975

[54] FISHING LURES

[76] Inventor: Alexander John Ingram, 40 Kilm Close, Mevagissey-Cornwall, England

[22] Filed: June 12, 1973

[21] Appl. No.: 369,150

[30] Foreign Application Priority Data
Dec. 20, 1972 Great Britain ............... 58762/72

[52] U.S. Cl. ............ 43/42.35, 43/42.26, 43/42.37, 43/42.39, 43/42.53
[51] Int. Cl. ............................................. A01k 85/00
[58] Field of Search ............ 43/42.26, 42.53, 42.39, 43/42.35, 42.38

[56] References Cited
UNITED STATES PATENTS

| | | | |
|---|---|---|---|
| 963,202 | 7/1910 | Bohannan | 43/42.35 X |
| 1,993,798 | 3/1935 | Peterson | 43/42.39 X |
| 2,186,780 | 1/1940 | DeWitt | 43/42.35 |
| 2,596,201 | 5/1952 | Bocchino | 43/42.35 X |
| 2,691,841 | 10/1954 | Daniel | 43/42.38 X |
| 2,718,668 | 9/1955 | Burke | 43/42.53 X |
| 2,832,169 | 4/1958 | Clapp | 43/42.39 X |
| 3,133,371 | 5/1964 | Christensen | 43/42.37 X |
| 3,514,358 | 5/1970 | Monaghan et al. | 43/42.53 X |
| 3,755,952 | 9/1973 | Oliphant | 43/42.26 X |

FOREIGN PATENTS OR APPLICATIONS

| | | | |
|---|---|---|---|
| 1,025,393 | 1/1953 | France | 43/42.37 |
| 1,501,858 | 10/1967 | France | 43/42.53 |
| 81,897 | 6/1953 | Norway | 43/42.38 |

*Primary Examiner*—Louis G. Mancene
*Assistant Examiner*—Daniel J. Leach
*Attorney, Agent, or Firm*—Ulle C. Linton

[57] ABSTRACT

A fishing lure in the form of a facsimile fish of a flexible material including a hollow interior communicating with the outside through the fish's mouth. The hollow interior includes an upper compartment to trap air and a lower compartment into which a weight may be inserted after manufacture. The lure is made by molding apparatus comprising a mold to shape the outside surfaces of the lure and a mold insert shaped to provide both the upper and lower compartments.

3 Claims, 3 Drawing Figures

3,861,075

FISHING LURES

BACKGROUND OF THE INVENTION

The invention relates to fishing lures. Fishing lures are objects which are attached to an angler's line to attract fish to the hook. They usually comprise a facsimile of a small fish on which the fish to be caught would normally feed, or alternatively, a shiny piece of metal. Usually the lures have a hook embedded in them or adjacent them.

SUMMARY OF THE INVENTION

According to a first aspect, the invention provides a fishing lure comprising an outer body having a hollow interior including a compartment in which a weight is situated, the compartment being provided in the lower part of the body, when the body, in use, is in its normal orientation, the hollow compartment having an aperture communicating with the external surface of the lure. Preferably, at least part of the hollow compartment is the same shape as the weight to be inserted therein. If the lure is in the form of a facsimile fish, the aperture may be the fish's mouth.

Fishing lures in accordance with the invention may be constructed of a flexible plastic material. This allows the lure, if in the form of a facsimile fish, to flex in the same way as a fish would flex, and by the suitable addition of fins, on its outer surface, further movement of the body and tail portion can be provided by the flow of water past the lure.

In any of the above described fishing lures, a hook may be inserted through the body of the fishing lure and, if the fishing lure is in the form of a facsimile fish, the eye of the hook may protrude from the mouth of the fish and the point from its belly.

The fishing lure may include a compartment situated in the upper part of the body when the body is in its normal orientation in which, in use, air may be trapped. The bottom surface of the compartment may have an upstanding lip extending across an open end of the compartment so as to retain the air in the compartment if the lure is inverted from its normal orientation. The presence of an air bubble in the compartment tends, of course, to keep the lure in an upright position, and the lip, by reducing the possibility of the air escaping from the compartment, renders the lure self righting in the event of its inversion by turbulent water.

Alternatively, the upper compartment may contain foamed material or an air filled capsule.

According to a second aspect of the invention there is provided apparatus for making a fishing lure, comprising a mold to shape the outside surfaces of the lure and a mold insert shaped to provide a compartment for holding a weight within the fishing lure. The mold may be shaped so as to provide a fishing lure in the shape of a facsimile fish, in which case, the mold insert preferably is shaped to form the interior of the mouth of the fish. The mold insert may include a portion to provide a compartment within the lure body situated in the upper part of the body when the lure in use is in its normal orientation, said portion preferably further including means to provide the bottom surface of the compartment with an upstanding lip extending across an open end of the compartment.

The mold insert may also include means to provide a channel through the lure through which the shank of a hook may be inserted.

The invention also provides a method of making a lure as aforesaid comprising injecting a settable material into the aforesaid apparatus and, when set, removing the lure body and inserting a weight into the compartment therefor.

DESCRIPTION OF THE PREFERRED EMBODIMENTS

Figure 1:
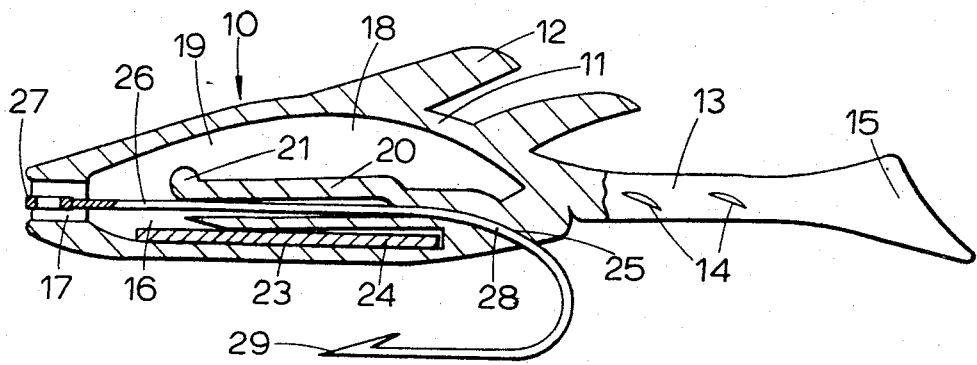
FIG. 1 is a partial section of a fishing lure in accordance with the invention, constructed in the form of a facsimile of a minnow.
Figure 2:
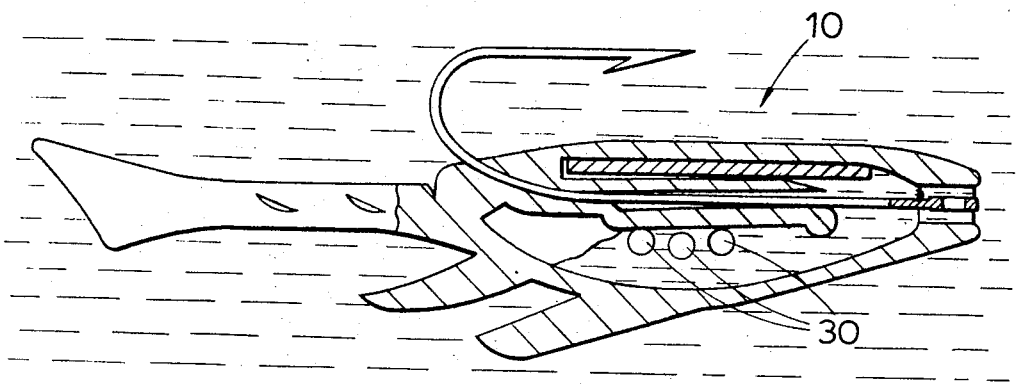
FIG. 2 is a section similar to FIG. 1 showing the lure upside down in water, and, FIG. 3 shows in diagrammatic form a mold for making the lure of FIGS. 1 and 2.

The lure shown in FIGS. 1 and 2 is in the shape of a minnow which is a fish eaten by larger fish which it is intended to catch. The lure 10 comprises a flexible plastic outer body 11 including fins 12 and a tail 13. The tail 13 incorporates further fins 14 and 15 so that, in use, as the water passes the lure, the fins 15 cause the tail 13 and the remaining parts of the body to flex and move in a lifelike manner. The outer surface of the body 11 is painted in natural colors.

As can be seen from FIG. 1, the lure 10 has a hollow interior 16 communicating with an aperture 17 forming the mouth of the fish. A first compartment 18 is situated in the upper part of the lure when the lure is in its normal orientation. As can be seen, the first compartment 18 is closed except for an opening 19 at the front end. The bottom surface 20 of the first compartment 18 includes an upstanding lip 21 extending across the opening 19. The fishing lure includes a further second compartment 23 in the lower part of the lure 10, one end of the compartment 23 communicating with the aperture 17 of the lure. Situated within the second compartment 23 is a weight 24 of lead which is the same shape as compartment 23.

Between the two compartments 18 and 23 there is provided a channel 25 extending generally from the region of the mouth aperture 17 of the lure to the belly of the fish. A hook 26 is mounted within the channel 25, so that the eye 27 of the hook is within the mouth aperture 17, the shank 28 extends along the channel 25 and the point portion 29 extends from the belly.

In use the fishing lure is used in the normal way. The end of the fishing line is attached to the eye 27 of the hook and cast into the water where it is intended to attract a fish which, in the process of attempting to take the facsimile minnow, bites on the hook 26. It will be appreciated that when the lure is cast into the water the interior of the fish is full of air. Some air will escape from the mouth aperture 17 when it hits the water but an air bubble is trapped in the first compartment 18. The combination of this air bubble in the first compartment 18 and the weight 24 maintain the lure in the upright position. However, if turbulence in the water upsets the lure, then the air is not lost from the first compartment 18 because it is trapped by the lip 21. The action of the lip 21 is illustrated in FIG. 2 showing the lure in the transient upside down position. As can be seen the bubbles of air 30 are trapped by the lip 21. A combination of the buoyancy of these air bubbles 30 and the weight 24 will tend to right the lure.

Figure 3:
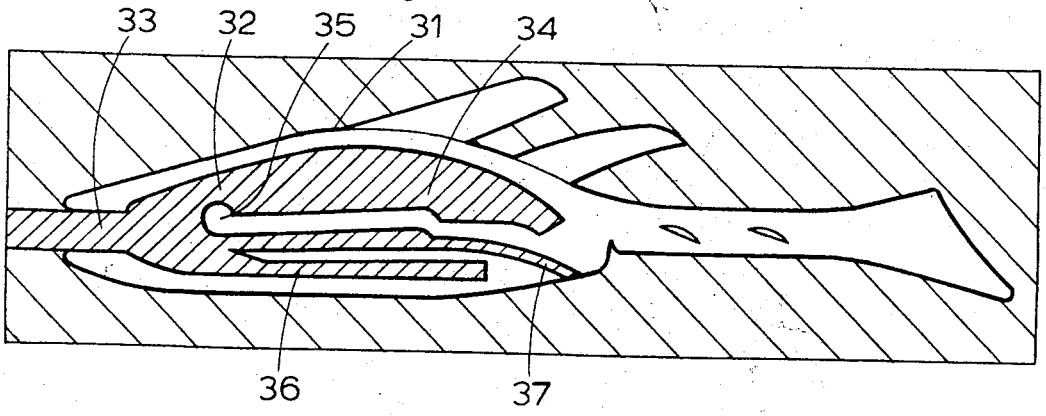

Further features of the invention reside in the apparatus for making the lure described above. Turning now to FIG. 3 there is shown a mold for making the lure of FIGS. 1 and 2. The mold comprises an outer mold part 31 (which will be in two parts to split it to allow removal of the finished lure) and a mold insert 32. The mold insert 32 comprises a tongue portion 33 for forming the interior of the mouth aperture 17 of the lure. It also provides support for the mold insert 32 within the outer mold 31. The mold insert 32 further includes a portion 34 for forming the first compartment 18, and as can be seen, includes a suitable part 35 for forming the lip 21. The portion 37 is provided extending to what will be the belly of the fish for providing the channel 25. Further portion 36 is provided for forming the compartment for holding the weight 24.

In use, molten plastic material is injected under high pressure into the mold to form the plastic part of the lure. Although not shown in FIG. 3, the outer mold part 31 includes portions for providing fins 12, 14 and 15. The mold insert 32 is held rigidly within the outer mold part 31 by means of the tongue portion 33.

When the plastic material has set, the mold may be broken to remove the plastic part of the lure. Owing to its flexibility, the mold insert 32 can readily be removed. The hook 26 may be inserted in its channel and also the weight 24 can be inserted through the mouth into its compartment 23. Herein lies one of the advantages of the invention in that in prior apparatus for making fishing lures, the weight 24 formed part of the mold insert and this caused difficulties in holding the weight 24 in its correct position under the high pressure of plastic when injected into the mold. By suitably designing the compartment 23 to allow the weight 24 to be inserted through the mouth aperture 17 into its compartment 23 after the lure has been molded, this problem is overcome. After molding and insertion of the hook and weight, the lure is suitably painted to reproduce the marking of a minnow.

The principle of the invention may be applied to other forms of lure. Obviously, other forms of fish could be used, but also other types of lure may be formed in this way.

It will be appreciated that in place of an empty first compartment 18 containing air, there may be provided a compartment of similar shape which contains an air cell comprising a plastics capsule in which air is strapped. If the capsule is of the right shape it may also be inserted through the mouth aperture 17 after the lure has been molded. A further arrangement to prevent air from escaping from the compartment 18 comprises the introduction into the compartment 18 of a plastic cellular material containing air inside the cells. The cellular material should preferably have closed cells to prevent the ingress of water into the cellular structure.

I claim:

1. A fishing lure comprising an outer body having a hollow interior including a compartment in which a weight is situated, said compartment being provided in the lower part of said body when said body, in use, is in its normal orientation, said hollow interior having an aperture communicating with the external surface of the lure, a compartment situated in the upper part of said body when said body is in its normal orientation in which, in use, air may be trapped, the bottom surface of said upper compartment having an upstanding lip extending across an open end of said compartment so as to retain the air in said compartment if the lure is inverted from its normal orientation.

2. A lure as claimed in claim 1 in which the said body is in form of a facsimile of a fish, and said open end of said upper compartment is in communication with the fish mouth of said body.

3. Apparatus for making a fishing lure, comprising a mold to shape the outside surfaces of the lure, and a mold insert shaped to provide a lower compartment for holding a weight within the fishing lure, said mold insert including a further portion to provide an upper compartment within the lure body situated in the upper part of the body when the lure, in use, is in its normal orientation, said further portion further including means to provide the bottom surface of said upper compartment with an upstanding lip extending across an open end of said upper compartment.

* * * * *